(12) United States Patent
Meguro (10) Patent No.: US 8,236,438 B2
(45) Date of Patent: Aug. 7, 2012

(54) NONAQUEOUS ELECTROLYTE BATTERY

(75) Inventor: Takeshi Meguro, Fukushima (JP)

(73) Assignee: Sony Corporation, Tokyo (JP)

( * ) Notice: Subject to any disclaimer, the term of this patent is extended or adjusted under 35 U.S.C. 154(b) by 523 days.

(21) Appl. No.: 12/430,362

(22) Filed: Apr. 27, 2009

(65) Prior Publication Data

US 2009/0274949 A1     Nov. 5, 2009

(30) Foreign Application Priority Data

May 2, 2008   (JP) ................. 2008-120108

(51) Int. Cl.
*H01M 2/12*   (2006.01)
(52) U.S. Cl. ............... 429/56; 429/53; 429/72; 429/82; 429/163; 429/164; 429/185
(58) Field of Classification Search ............ 429/53, 429/56, 72, 82, 163, 164, 185
See application file for complete search history.

(56) References Cited

U.S. PATENT DOCUMENTS

| | | | |
|---|---|---|---|
| 6,723,465 B2 * | 4/2004 | Segawa et al. ............ | 429/56 |
| 2006/0007878 A1 | 1/2006 | Xu et al. | |
| 2007/0009785 A1 * | 1/2007 | Kozuki et al. ............ | 429/53 |
| 2007/0172728 A1 * | 7/2007 | Yamashita et al. ......... | 429/174 |

FOREIGN PATENT DOCUMENTS

| | | |
|---|---|---|
| JP | 63-165770 | 10/1988 |
| JP | 63-167669 | 11/1988 |
| JP | 10-284037 | 10/1998 |
| JP | 2004-319465 | 11/2004 |

OTHER PUBLICATIONS

Japanese Office Action for corresponding JP2008-120108 issued on Oct. 26, 2010.

* cited by examiner

*Primary Examiner* — Patrick Ryan
*Assistant Examiner* — Ladan Mohaddes
(74) *Attorney, Agent, or Firm* — K&L Gates LLP (57) ABSTRACT

A nonaqueous electrolyte battery includes an outer case having one open end portion, a battery element held in the outer case, and a battery lid which is disposed on the one open end portion and which is provided with a protrusion portion protruded toward the outside of the battery, at least two opening portions disposed in the protrusion portion, and release portions disposed adjoining the respective opening portions so as to deform in accordance with an increase in internal pressure of the battery.

6 Claims, 7 Drawing Sheets

NONAQUEOUS ELECTROLYTE BATTERY

CROSS REFERENCES TO RELATED APPLICATIONS

The present application claims priority to that disclosed in Japanese Priority Patent Application JP 2008-120108 filed in the Japan Patent Office on May 2, 2008, the entire content of which is hereby incorporated by reference.

BACKGROUND

The present application relates to nonaqueous electrolyte battery. In particular, it relates to a nonaqueous electrolyte battery capable of suppressing an increase in battery internal pressure safely when the battery internal pressure increases.

In recent years, many portable electronic apparatuses, e.g., a camera-integrated VTR (videotape recorder), a cellular phone, and a laptop computer, have made their debuts, and an achievement of miniaturization and higher functionality thereof is facilitated. Along with the trends, demands for batteries serving as power supplies of the portable electronic apparatuses have expanded sharply. Therefore, in order to realize miniaturization of apparatuses, development of a secondary battery having a large energy density and a large power density has been conducted. As for a battery which meets such demands, a lithium ion secondary battery including a positive electrode produced by using a composite material of lithium and a transition metal and a negative electrode produced by using, for example, a carbon material is most suitable.

Regarding the lithium ion battery, an electrolytic solution and an active material are decomposed through overcharge, internal short-circuit, or the like, gases are generated in the inside of the battery, and a battery internal pressure increases. Consequently, the battery may be deformed or exploded because of this increase in battery internal pressure. Therefore, the battery has a structure in which the gases generated in the battery can be released to the outside of the battery.

Figure 7A:
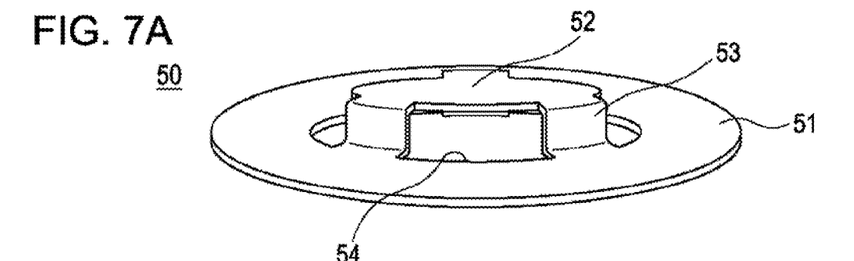
FIGS. 7A to 7C are schematic diagrams showing a configuration example of a battery lid of a nonaqueous electrolyte secondary battery in the related art.
Figure 7B:
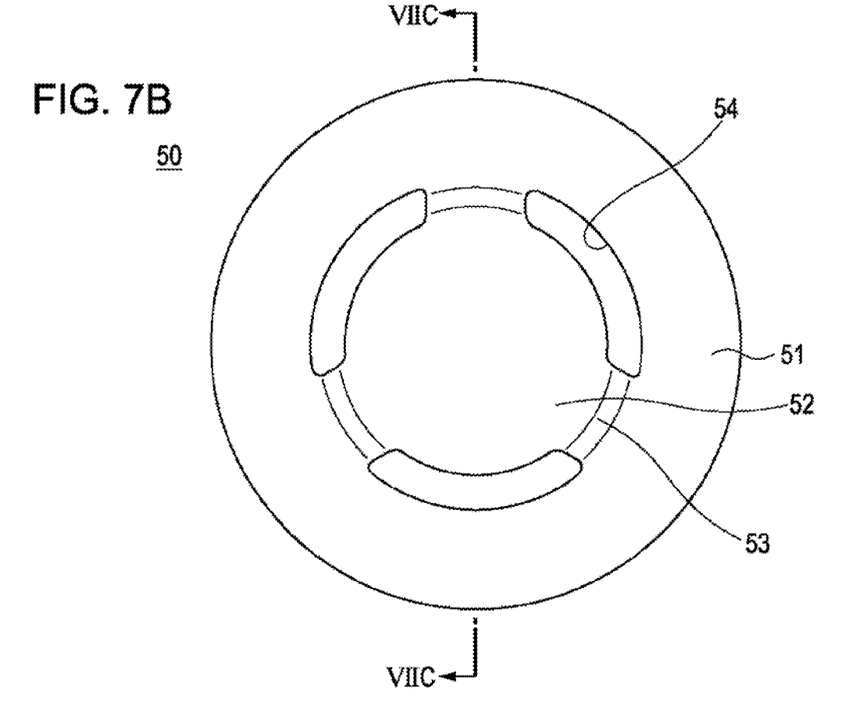
Figure 7C:
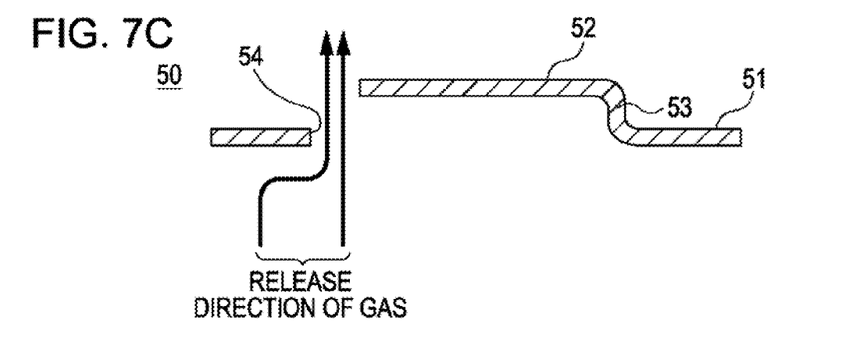

FIG. 7A is a perspective view of a battery lid 50 in the related art used in a cylindrical battery. FIG. 7B is a top view of the battery lid 50 in the related art. FIG. 7C is a sectional view of a section taken along a line VIIC-VIIC shown in FIG. 7B of the battery lid 50 in the related art, viewed from a direction indicated by arrows.

The battery lid 50 is in the shape of a hat in which a central portion of a circular plate is substantially uniformly protruded in an axis line direction. The battery lid 50 includes a cylindrical protrusion portion 52 disposed at a central portion and an annular flange-shaped portion 51 disposed in such a way as to surround this protrusion portion 52.

A plurality of opening portions 54 are disposed in a side wall 53 of the protrusion portion 52, while the side wall 53 is in the shape of a cylinder surface. For example, the plurality of opening portions 54 are disposed at regular intervals in the side wall 53 of the protrusion portion 52.

When gases are generated in the inside of the battery, the pressure in the inside of the battery increases. If a pressure difference occurs between the inside and the outside of the battery, as shown in FIG. 7C, gases generated in the inside of the battery flow through the opening portions 54 toward the outside and, thereby, are released. Consequently, a pressure increase in the inside of the battery is avoided.

Japanese Unexamined Patent Application Publication No. 2004-319465 describes a technology in which opening portions are disposed in a battery lid and gases generated in the inside of the battery are released to the outside, as described above.

Furthermore, for example, Japanese Unexamined Utility Model Registration Application Publication No. 63-167669 describes a configuration in which a vent hole is disposed in a battery lid and, in addition, wedge-shaped annular grooves, which are concentric and which have different diameters, are formed oppositely in the battery lid from top and bottom surfaces of the battery lid so as to provide a thin-walled portion in a part of the battery lid.

Regarding the battery according to Japanese Unexamined Utility Model Registration Application Publication No. 63-167669, even when the vent hole disposed in the battery is blocked in the case where the battery internal pressure increases, a part of the battery lid is cut at the thin-walled portion disposed in the battery lid (terminal plate), and the battery lid comes into the state of being chipped. The internal pressure is relieved through this chipped portion and, thereby, breakage of the battery is prevented.

SUMMARY

However, regarding a battery having the configuration described in Japanese Unexamined Patent Application Publication No. 2004-319465, in the case where large amounts of gases are generated in the inside of the battery, gas-bleeding performance is reduced in release of the gases. In this case, the battery may be moved during release of gases because the pressure of the gases to be released is high. Furthermore, in the case where an opening area in the battery lid is too large, the strength of the battery lid is reduced. Therefore, it is difficult to ensure the compatibility between the safety of the battery and the high quality merely by increasing the opening area.

Moreover, in the case where a battery having the configuration described in Japanese Unexamined Utility Model Registration Application Publication No. 63-167669 is used, breakage of the thin-walled portion may generate a large opening in the central portion of the battery lid, and there is a danger because the contents of the battery may jump out to the outside of the battery.

Accordingly, it is desired to provide a nonaqueous electrolyte battery capable of suppressing an increase in battery internal pressure safely when the battery internal pressure increases.

A nonaqueous electrolyte battery according to an embodiment includes an outer case having one open end portion, a battery element held in the outer case, and a battery lid which is disposed on the one open end portion and which is provided with a protrusion portion protruded toward the outside of the battery, at least two opening portions disposed in the protrusion portion, and release portions disposed adjoining the respective opening portions so as to deform in accordance with an increase in internal pressure of the battery.

In the above-described nonaqueous electrolyte battery, preferably, the release portions disposed in the battery lid are disposed at a top portion of the protrusion portion of the battery lid. Furthermore, preferably, a total of the opening area of the opening portions and the area of the release portions is 15% or more, and 30% or less of the area of the battery lid.

Preferably, the release portions disposed in the battery lid are thin-walled portions having thicknesses smaller than the thicknesses of the other portions of the battery lid. It is preferable that the thicknesses of the thin-walled portions are 10% or more, and 75% or less of the thicknesses of the other portions of the battery lid.

The release portions disposed in the battery lid may be formed by disposing groove portions in the battery lid in a direction from the inside of the battery. It is preferable that the thicknesses of the groove portions are 5% or more, and 30% or less of the thicknesses of the other portions of the battery lid.

A battery lid according to an embodiment includes a protrusion portion which is protruded in one direction, at least two opening portions disposed in the protrusion portion, and release portions disposed adjoining the respective opening portions and configured to deform in the one direction.

In an embodiment, in the case where gases are generated in the inside of the battery, the gases are released through the opening portions disposed in the battery lid. Furthermore, in the case where large amounts of gases are generated, the release portions are deformed toward the outside direction of the battery or are fused or dissolved by a pressure or heat due to the release of the gases, so that the area of portions, through which the gases are released, can be increased.

According to an embodiment, in the case where large amounts of gases are generated, gases can be released through the opening portions and the gas release portions. Therefore, it is possible to suppress an increase in battery internal pressure and enhance the safety. Furthermore, gases can be released without reducing the strength of the battery lid portion.

Additional features and advantages are described herein, and will be apparent from the following Detailed Description and the figures.

DETAILED DESCRIPTION

The present application will be described below with reference to the drawings according to an embodiment.

Figure 1:
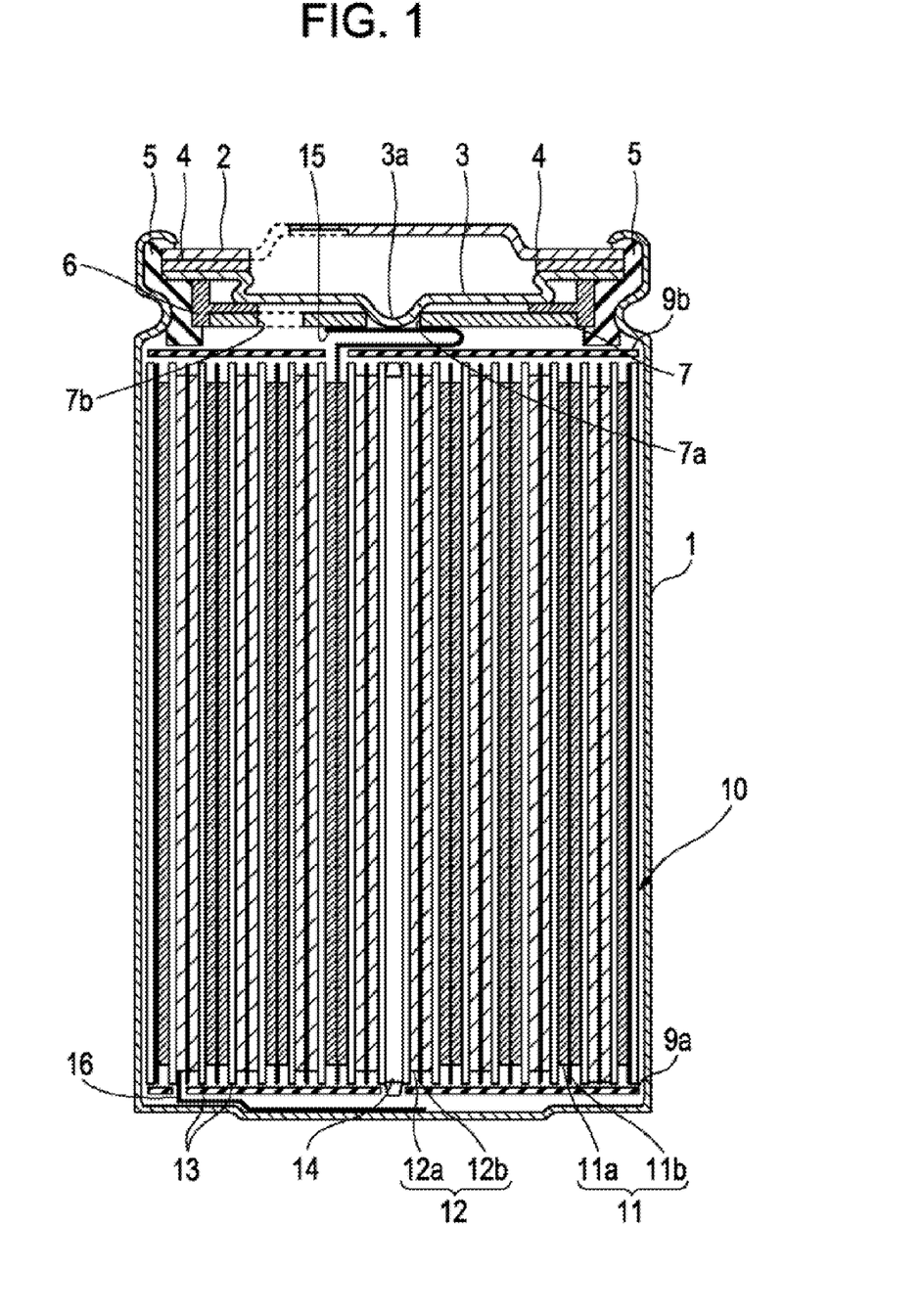
FIG. 1 is a sectional view showing a configuration example of a nonaqueous electrolyte secondary battery according to an embodiment.

FIG. 1 is a sectional view of a lithium ion secondary battery which is an example of a nonaqueous electrolyte secondary battery according to an embodiment. This secondary battery is of a so-called cylindrical type and includes a battery element 10, in which a band-shaped positive electrode 11 and a band-shaped negative electrode 12 are rolled with a separator 13 therebetween, in the inside of a substantially hollow, cylindrical battery can 1. The battery can 1 is formed from, for example, iron plated with nickel, one end portion thereof is closed, and the other end portion is opened. In the inside of the battery can 1, a pair of insulating plates 9a and 9b are disposed perpendicularly to a circumferential surface of the roll in such a way as to sandwich the battery element 10.

Examples of materials for the battery can 1 include iron (Fe), nickel (Ni), stainless steel (SUS), aluminum (Al), and titanium (Ti). This battery can 1 may be plated with, for example, nickel in order to prevent electrochemical corrosion by a nonaqueous electrolytic solution along with charge and discharge of the battery. A battery lid 2, which serves as a positive electrode terminal plate, and a safety valve mechanism and a positive temperature coefficient element (PTC element) 4, which are disposed on the inner side of the battery lid 2, are attached to the open end portion of the battery can 1 by swaging with an insulative sealing gasket 5 therebetween.

The battery lid 2 is formed from, for example, the same material as the material for the battery can 1 and is provided with opening portions for releasing gases generated in the inside of the battery. In the safety valve mechanism, a safety valve 3, a disk holder 6, and an interruption disk 7 are stacked sequentially. The protrusion portion 3a of the safety valve 3 is connected to a positive electrode terminal 15 led from the battery element 10 through a hole portion disposed in the central portion of the interruption disk 7. The safety valve mechanism is electrically connected to the battery lid 2 with the PCT element 4 therebetween.

Regarding the safety valve mechanism, in the case where the internal pressure of the battery becomes a predetermined value or more because of short-circuit in the inside of the battery or heating from the outside of the battery, the safety valve 3 is inverted and, thereby, electrical connection between the protrusion portion 3a, the battery lid 2, and the battery element 10 is cut. That is, when the safety valve 3 is inverted, the positive electrode terminal 15 is held by the interruption disk 7, and the connection between the safety valve 3 and the positive electrode terminal 15 is disengaged. The disk holder 6 is formed from an insulating material, and when the safety valve 3 is inverted, the safety valve 3 is insulated from the interruption disk 7.

Moreover, in the case where gases are further generated in the inside of the battery and the battery internal pressure further increases, a part of the safety valve 3 is ruptured, so that gases can be released to the battery lid 2 side.

For example, a plurality of vent holes 7b are disposed in the periphery of a hole portion 7a of the interruption disk 7, and in the case where gases are generated from the battery element 10, the gases can be released to the battery lid 2 side effectively.

The resistance value of the PTC element 4 increases when the temperature is raised and, thereby, electrical connection between the battery lid 2 and the battery element 10 is cut, so that a current is interrupted. Consequently, abnormal heat generation due to excess current is prevented. The insulative sealing gasket 5 is formed from, for example, an insulating material and the surface is coated with asphalt.

The battery element 10 held in the lithium ion secondary battery is rolled around a center pin 14. The positive electrode terminal 15 is connected to the positive electrode 11 of the battery element 10, and a negative electrode terminal 16 is connected to the negative electrode 12. As described above, the positive electrode terminal 15 is welded to the safety valve 3 and, thereby, is electrically connected to the battery lid 2. The negative electrode terminal 16 is welded to the battery can 1 so as to be electrically connected.

The configuration of the battery element 10 held by the battery can 1 will be described below.

Positive Electrode

The positive electrode 11 is produced by forming positive electrode active material layers 11a containing a positive electrode active material on both surfaces of a positive electrode collector 11b. The positive electrode collector 11b is formed from metal foil, e.g., aluminum (Al) foil, nickel (Ni) foil, or stainless steel (SUS) foil.

The positive electrode active material layer 11a is configured to contain, for example, a positive electrode active material, an electrically conductive agent, and a binder. Positive electrode active materials, which can undergo doping and dedoping of lithium ions, in the related art can be used for the above-described positive electrode active material. A metal oxide, a metal sulfide, or a specific polymer can be used in accordance with the type of desired battery. For example, a lithium-free metal sulfide or metal oxide, e.g., $TiS_2$, $MoS_2$, $NbSe_2$, or $V_2O_5$, a lithium composite oxide primarily containing $Li_xMO_2$ or $Li_xM_2O_4$ (where M represents at least one type of transition metal, x is different depending on a charge and discharge state of a battery, and usually, $0.05 \leq x \leq 1.10$ is satisfied), or an interlayer compound containing lithium is used. As for a transition metal constituting them, at least one type of cobalt (Co), nickel (Ni), manganese (Mn), iron (Fe), aluminum (Al), vanadium (Vd), and titanium (Ti) is selected.

Specific examples of such lithium composite oxides include $LiCoO_2$, $LiNiO_2$, $LiNi_yCo_{1-y}O_2$ (where $0<y<1$ is satisfied), or $LiMn_2O_4$. Such lithium composite oxides are particularly preferable materials because they can generate high voltages by being used as positive electrode active materials and are excellent in energy density.

Furthermore, $Li_aMX_b$ (where M represents one type selected from the above-described transition metals, X is selected from S, Se, and $PO_4$, and a and b are integers) may also be used.

As for the positive electrode active material, a plurality of types of the above-described positive electrode active materials may also be used in combination.

The electrically conductive agent is not specifically limited insofar as the electrical conductivity can be provided by mixing an appropriate amount of agent with a positive electrode active material. For example, carbon materials, e.g., carbon black and graphite, are used. Furthermore, binders usually used for a positive electrode mix of this type of battery in the related art may be used as the above-described binder. Preferably, fluororesins, e.g., polyvinyl fluorides, polyvinylidene fluorides, and polytetrafluoroethylenes, are used.

One positive electrode terminal 15 is connected to one end portion of the positive electrode 11 by spot welding or ultrasonic welding. It is desirable that this positive electrode terminal 15 is in the shape of metal foil or mesh. However, even if the positive electrode terminal 15 is not formed from a metal, there is almost no specific problem insofar as the electrochemical, chemical stability is ensured and there is continuity. Examples of materials for the positive electrode terminal 15 include Al. The positive electrode terminal 15 is connected to an exposed portion of the positive electrode collector 11b disposed at an end portion of the positive electrode 11.

Negative Electrode

The negative electrode 12 is produced by forming negative electrode active material layers 12a containing a negative electrode active material on both surfaces of a negative electrode collector 12b. The negative electrode collector 12b is formed from metal foil, e.g., copper foil, nickel foil, or stainless steel foil.

The negative electrode active material layer 12a is configured to contain, for example, a negative electrode active material and, if necessary, an electrically conductive agent and a binder. Carbon materials, which can undergo doping and dedoping of lithium, and a crystalline or amorphous metal oxide may be used for the above-described positive electrode active material. Specific examples of carbon materials, which can undergo doping and dedoping of lithium, include graphite, hard-to-graphitize carbon materials, graphitizable carbon materials, and highly crystalline carbon materials having a developed crystalline structure. More specifically, carbon materials, e.g., pyrolytic carbon, coke (pitch coke, needle coke, and petroleum coke), graphite, glassy carbon, organic polymer compound fired products (products produced by firing phenol resins, furan resins, and the like at appropriate temperatures so as to carbonize), carbon fibers, and activated carbon and polymers, e.g., polyacetylenes, may be used.

Examples of other negative electrode active materials include metals capable of forming alloys with lithium or alloy compounds of such metals. The alloy compounds here specifically refer to compounds represented by $M_pM_q'Li_r$ (where M' represents at least one metal element other than a Li element and an M element, p is a numerical value larger than 0, and q and r are numerical values larger than or equal to 0), wherein M represents a metal element capable of forming an alloy with lithium. Moreover, in the present application, elements, e.g., B, Si, and As, which are semiconductor elements are included in the metal elements. Specific examples include individual metals of magnesium (Mg), boron (B), aluminum (Al), gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr), and yttrium (Y) and alloy compounds thereof, that is, for example, Li—Al, Li—Al-M (where M represents at least one of group 2A, group 3B, and group 4B transition metal elements), AlSb, CuMgSb, and the like are mentioned.

Among the above-described elements, it is preferable that group 14 metal elements or half metal elements in the long form periodic table are contained as constituent elements. It is particularly preferable that at least one of silicon and tin is contained as a constituent element. This is because silicon and tin have a large capability of absorbing and releasing lithium and, therefore, high energy densities can be obtained. Specific examples include a simple substance, alloys, and compounds of silicon, a simple substance, alloys, and compounds of tin, and materials having a phase of at least one type of them as at least a part thereof.

In particular, as for this negative electrode material, CoSnC-containing materials containing tin, cobalt, and carbon (C) as constituent elements or FeSnC-containing materials containing tin, iron, and carbon as constituent elements are preferable. This is because high energy densities can be obtained and, in addition, excellent cycle characteristics can be obtained. It is preferable that this CoSnC-containing material has a phase containing tin, cobalt, and carbon, and this phase has a low-crystalline or amorphous structure. Likewise, preferably, the FeSnC-containing material has a phase containing tin, iron, and carbon, and this phase has a low-crystalline or amorphous structure. Furthermore, in the CoSnC-containing material and the FeSnC-containing material, it is preferable that at least a part of carbon which is a constituent element is bonded to a metal element or a half metal element which is another constituent element. This is because it is believed that cycle characteristics deteriorate through cohesion or crystallization of tin and the like, but such cohesion or crystallization can be suppressed by the bonding of carbon to another element. Moreover, the CoSnC-containing, material and the FeSnC-containing material may contain other constituent elements, if necessary.

The electrically conductive agent is not specifically limited insofar as the electrical conductivity can be provided by mixing an appropriate amount of agent with a negative electrode active material. For example, carbon materials, e.g., carbon black and graphite, may be used. Furthermore, as for the binder, for example, polyvinylidene fluorides and styrene butadiene rubber are used.

One negative electrode terminal 16 is connected to one end portion of the negative electrode 12 by spot welding or ultrasonic welding. Even if the negative electrode terminal 16 is not formed from a metal, there is almost no specific problem insofar as the electrochemical, chemical stability is ensured and there is continuity. Examples of materials for the negative electrode terminal 16 include copper (Cu) and nickel (Ni). In a manner similar to that in the positive electrode terminal 15, the negative electrode terminal 16 is connected to an exposed portion of the negative electrode collector 12b disposed at an end portion of the negative electrode 12.

Electrolyte

As for the electrolyte, any one of nonaqueous electrolytic solution in which an electrolytic salt is dissolved in a nonaqueous solvent, a solid electrolyte containing an electrolytic salt, and a gel electrolyte in which an organic polymer is impregnated with a nonaqueous solvent and an electrolytic salt may be used.

The nonaqueous electrolytic solution is prepared by combining a nonaqueous solvent and an electrolytic salt appropriately. Any organic solvent can be used insofar as the material is generally used for this type of battery. Preferable examples of nonaqueous solvents include propylene carbonate, ethylene carbonate, diethyl carbonate, dimethyl carbonate, methyl ethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetic acid esters, butyric acid esters, and propionic acid esters. These solvents may be used alone or in combination.

The electrolytic salt, which is soluble in the above-described nonaqueous solvents, is used and is formed by combining a cation and an anion. As for the cation, alkali metals and alkaline earth metals are used. As for the anion, $Cl^-$, $Br^-$, $I^-$, $SCN^-$, $ClO_4^-$, $BF_4^-$, $PF_6^-$, $CF_3SO_3^-$, and the like are used. Specific examples include LiCl, $LiClO_4$, $LiAsF_6$, $LiPF_6$, $LiBF_4$, $LiB(C_6H_5)_4$, LiBr, $CH_3SO_3Li$, $CF_3SO_3Li$, and $N(C_nF_{2n+1}SO_2)_2Li$. These salts may be used alone or in combination. Most of all, it is preferable that $LiPF_6$ is used primarily. The concentration of the electrolytic salt causes almost no problem insofar as the electrolytic salt can be dissolved into the above-described nonaqueous solvent at that concentration. However, it is preferable that the lithium ion concentration is within the range of 0.4 mol/kg or more, and 2.0 mol/kg or less relative to the nonaqueous solvent.

Any one of inorganic solid electrolytes and polymer solid electrolytes may be used as the solid electrolyte insofar as the material has lithium ion conductivity. Specific examples of inorganic solid electrolytes include lithium nitride and lithium iodide. Furthermore, the polymer solid electrolyte is formed from an electrolyte and polymer compound for dissolving the electrolyte. As for the polymer compounds, ether based polymers, e.g., poly(ethylene oxide) and cross-linked products thereof, poly(methacrylate) ester based polymers, acrylate based polymers, and the like may be used alone, through copolymerization into the molecule, or through mixing.

As for a matrix polymer for the gel electrolyte, various polymers may be used insofar as the polymers absorb and gelate the above-described nonaqueous electrolytic solutions. For example, fluoropolymers, e.g., poly(vinylidene fluoride) and poly(vinylidene fluoride-co-hexafluoropropylene), poly(ethylene oxide) and cross-linked products thereof, and poly(acrylonitrile) may be used. In particular, from the viewpoint of the oxidation-reduction stability, it is desirable that the fluoropolymers are used. The ion conductivity is provided by containing the electrolytic salt.

Moreover, polymer solid electrolytes containing a simple substance or a mixture of electrically conductive polymer compounds and gel electrolytes containing a swelling solvent may be used. The electrically conductive polymer compounds contained in the polymer solid electrolytes and the gel electrolytes are compatible with the electrolytic solutions, and specifically, silicon gel, acrylic gel, acrylonitrile gel, polyphosphazene-modified polymers, polyethylene oxides, polypropylene oxides, fluoropolymers, and composite polymers, cross-linked polymers, and modified polymers thereof may be used. As for the fluoropolymers, for example, polymer materials, e.g., poly(vinylidene fluoride), poly(vinylidene fluoride-co-hexafluoropropylene), poly(vinylidene fluoride-co-trifluoroethylene), and poly(vinylidene fluoride-co-tetrafluoroethylene), and mixtures thereof may be used.

Separator

The separator 13 is formed from, for example, a porous film made of a polyolefin based material, e.g., polypropylene (PP) or polyethylene (PE) or a porous film made of an inorganic material, e.g., ceramic nonwoven fabric, and may have a structure in which at least two types of these porous films are laminated. Most of all, a porous film of polypropylene or polyethylene is most effective.

In general, the thickness of a favorably used separator 13 is 5 to 50 μm, and more preferably 7 to 30 μm. If the separator 13 is too thick, the amount of filling of active material is reduced, so that the battery capacity is reduced and, in addition, the ion conductivity is reduced so as to deteriorate the current characteristic. Conversely, if the separator 13 is too thin, the mechanical strength of the film is reduced.

Figure 2A:
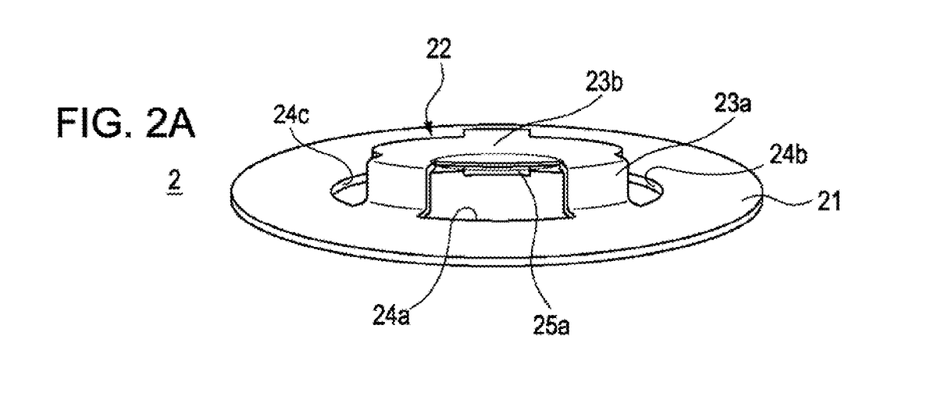
FIGS. 2A to 2C are schematic diagrams showing a configuration example of a battery lid of a nonaqueous electrolyte secondary battery according to an embodiment.
Figures 2B, 2C:
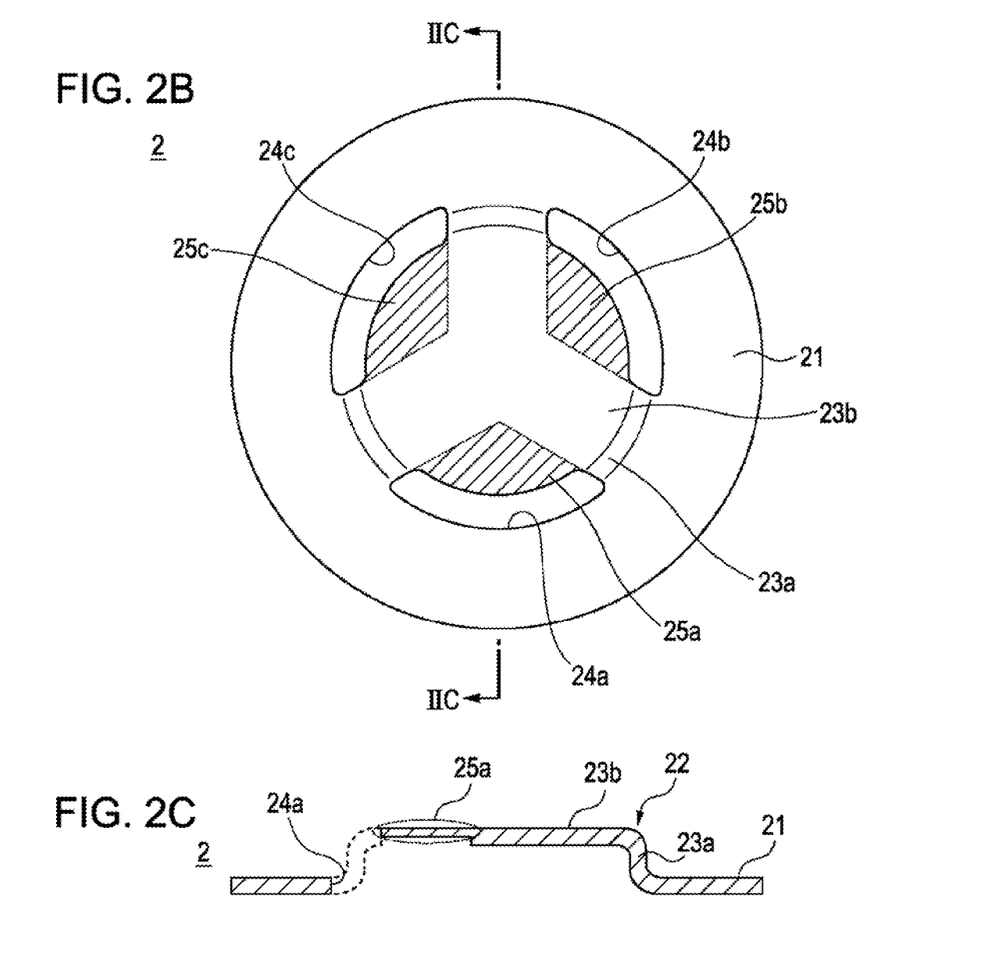

A battery lid 2 according to an embodiment will be described below in detail with reference to the drawings. FIG. 2A is a perspective view of a battery lid 2 according to an embodiment. FIG. 2B is a top view of the battery lid 2 according to an embodiment. FIG. 2C is a sectional view of a section taken along a line IIC-IIC shown in FIG. 2B of the battery lid 2, viewed from a direction indicated by arrows.

The battery lid 2 is in the shape of a hat in which a metal plate in the shape of a circular plate is subjected to press-molding in such a way that the central portion of the circular plate is substantially uniformly protruded in an axis line direction. The battery lid 2 includes a substantially cylindrical protrusion portion 22 disposed at the central portion and an annular flange-shaped portion 21 disposed in such a way as to surround the protrusion portion 22. As for the material for the battery lid 2, for example, the same material as that for the battery can 1 may be used. Specific examples of such materials include iron (Fe), nickel (Ni), and stainless steel (SUS).

A plurality of, for example, three opening portions 24a to 24c (appropriately referred to as opening portion 24 unless otherwise specified) are disposed in a side wall 23a of the protrusion portion 22. Since the opening portions 24a to 24c are disposed, in the case where gases are generated in the inside of the battery, the gases can be released through the opening portions 24a to 24c to the outside of the battery. For example, the opening portions 24a to 24c are disposed in the side wall 23a at regular intervals in a circumferential direction.

Thin-walled portions 25a to 25c (appropriately referred to as thin-walled portion 25 unless otherwise specified) in the shape of, for example, a fan are disposed as portions adjoining the opening portions 24a to 24c on the top portion 23b of the protrusion portion 22. The thin-walled portion 25 is formed having a thickness smaller than the thicknesses of the other portions of the battery lid 2.

Preferably, a total of the opening area of the opening portions 24a to 24c and the area of the thin-walled portions 25a to 25c is 15% or more, and 30% or less of the area of the battery lid 2. If the total opening area is too small, it becomes difficult to release gases and it becomes difficult to suppress an increase in battery internal pressure safely. If the total opening area is too large, the strength of the battery lid 2 is reduced, so that the battery may be damaged in the case where, for example, a pressure is applied toward the top portion and the bottom portion of the battery, and specifically in the case where the battery is fitted into a predetermined insertion portion of an electronic apparatus or the battery is dropped.

Incidentally, the "area of battery lid 2" refers to a total of the area of the upper surface of the flange-shaped portion 21 provided that the opening portion 24 is not disposed, the outer perimeter side-area of the side wall 23a, and the area of the upper surface of the top portion 23b.

Figure 3A:
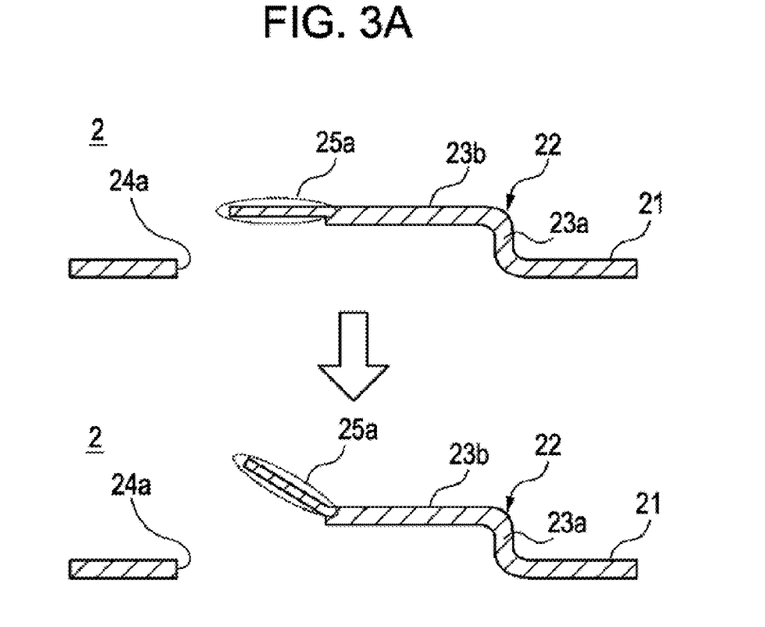
FIGS. 3A and 3B are sectional views showing a configuration example of a battery lid of a nonaqueous electrolyte secondary battery according to an embodiment.
Figure 3B:
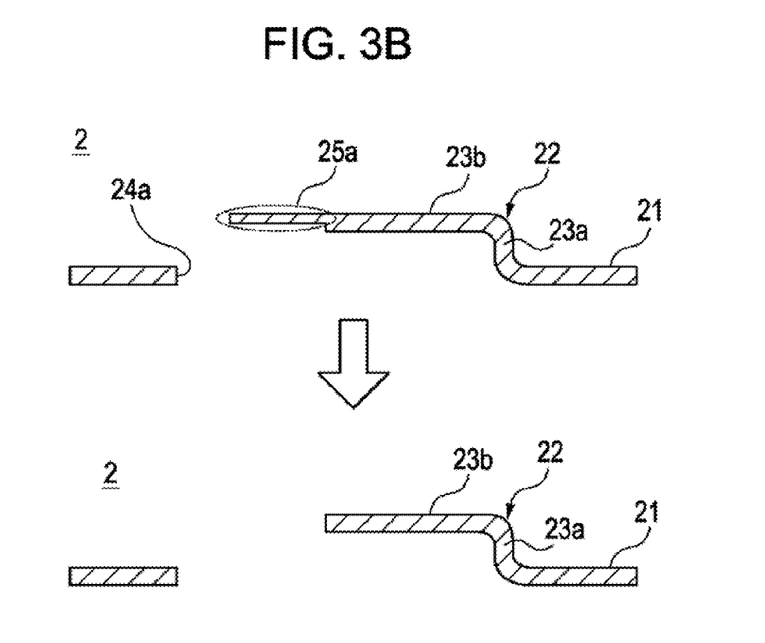

According to such a configuration, as shown in FIG. 3A, in the case where large amounts of gases are generated in the inside of the battery, the thin-walled portions 25a to 25c are deformed toward the outside of the battery because of the pressure of the respective gases released through the opening portions 24a to 24c and, thereby, the area capable of releasing gases can be increased. Furthermore, as shown in FIG. 3B, the thin-walled portions 25a to 25c may be fused or dissolved because of heat of the gases released. In this case as well, the area capable of releasing gases can be increased as in the case where the thin-walled portions 25a to 25c are deformed.

Preferably, the thickness of the thin-walled portion 25 is 10% or more, and 75% or less of the thicknesses of the other portions of the battery lid 2. If the thickness of the thin-walled portion 25 is too small, the strength of the battery is reduced. If the thickness of the thin-walled portion 25 is too large, an occurrence of deformation or fusion of the thin-walled portion 25 becomes difficult even when large amounts of gases are generated and the battery internal pressure becomes too high.

FIG. 2 shows a situation in which three thin-walled portions 25a to 25c are disposed in such a way as to adjoin the three opening portions 24a to 24c, respectively. It is preferable that the opening portions 24a to 24c are disposed at regular intervals and the thin-walled portions 25a to 25c are disposed at regular intervals relative to the center of the battery lid 2. Consequently, gases generated from any site of the battery element 10 can be released easily. The number of each of the opening portion 24 and the thin-walled portion 25 is not limited to three, and may be other than three. The numbers of the opening portion 24 and the thin-walled portion 25 may be different.

Figure 4A:
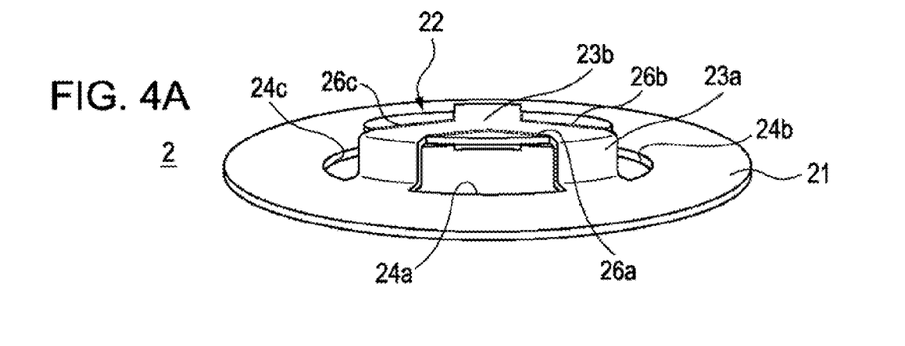
FIGS. 4A to 4C are schematic diagrams showing another configuration example of a battery lid of a nonaqueous electrolyte secondary battery according to an embodiment.
Figure 4B:
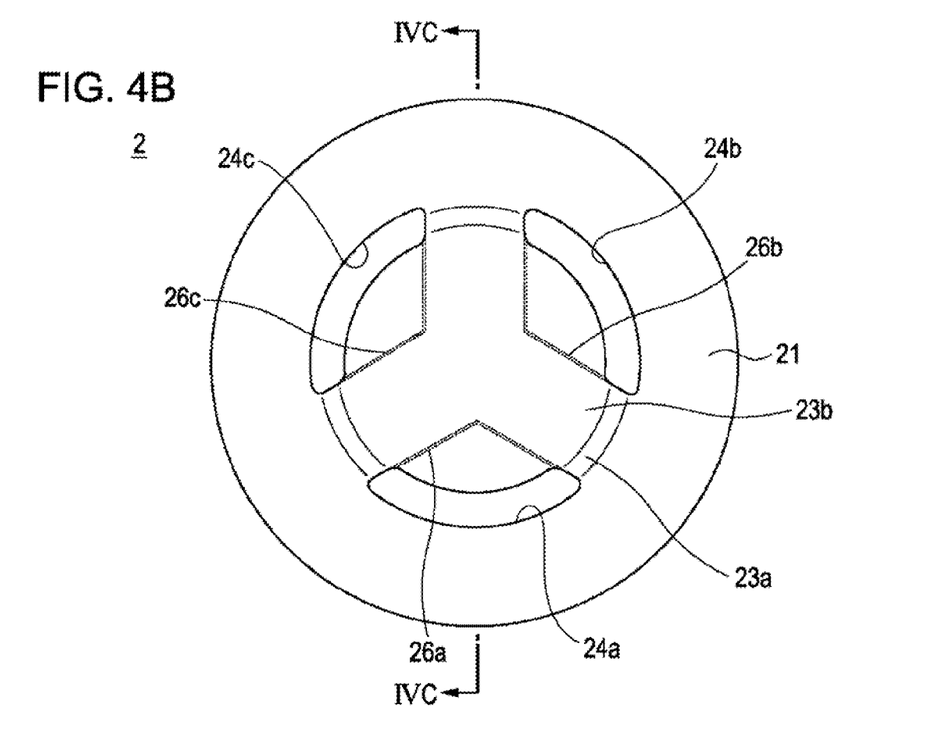
Figure 4C:
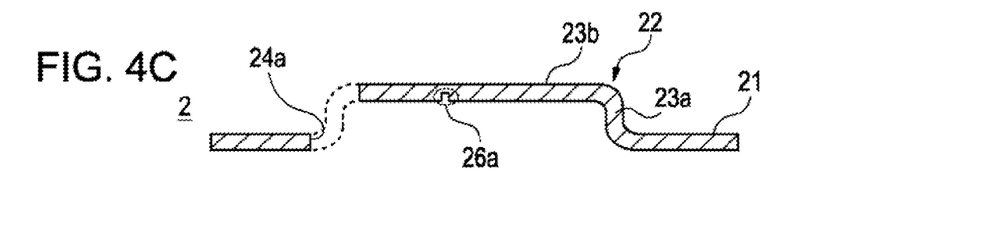
Figure 5A:
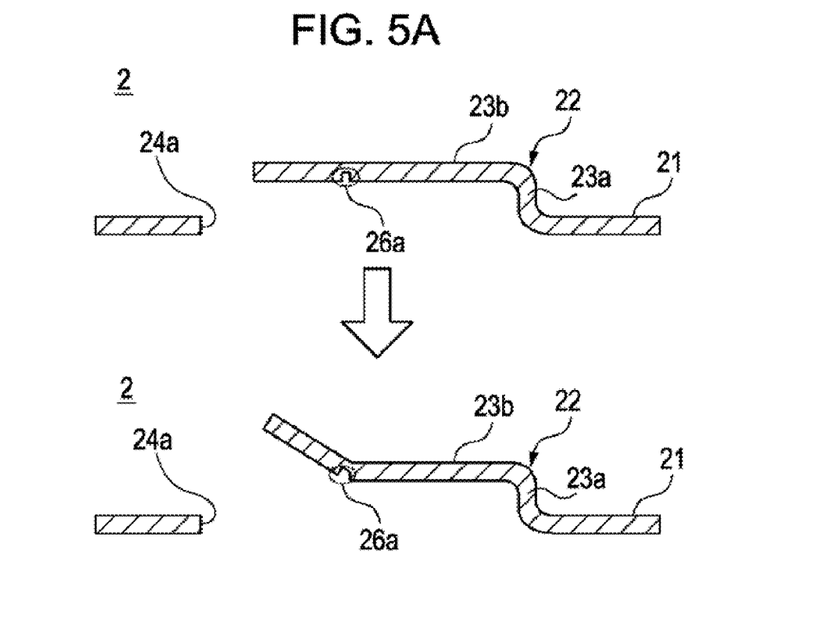
FIGS. 5A and 5B are sectional views showing another configuration example of a battery lid of a nonaqueous electrolyte secondary battery according to an embodiment.
Figure 5B:
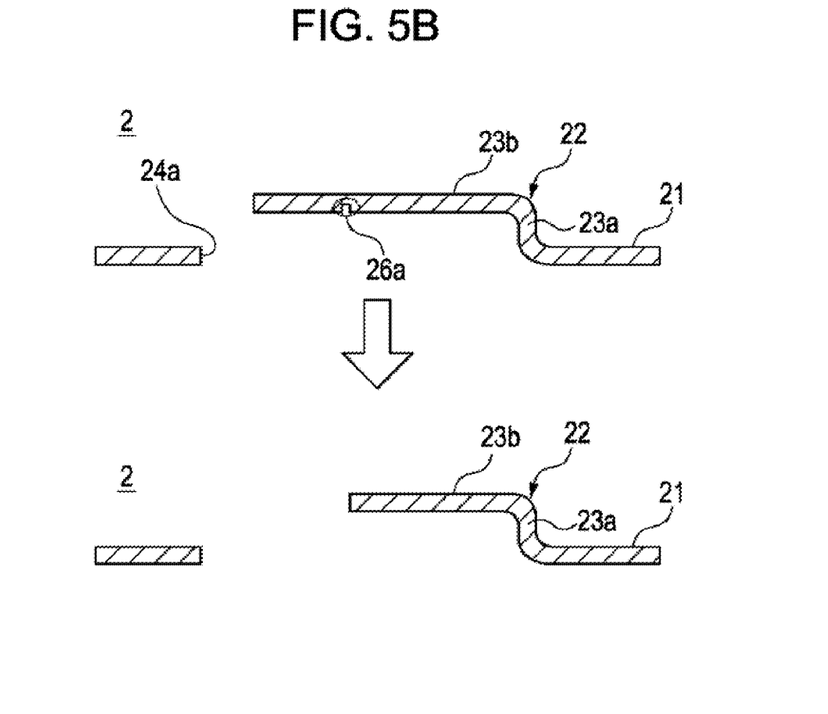

As shown in FIG. 4A to 4C, groove portions 26a to 26c (appropriately referred to as groove portion 26 unless otherwise specified) may be disposed in the top portion 23b of the protrusion portion 22 instead of the thin-walled portions 25a to 25c. The groove portion 26a is disposed in such a way that, for example, a region surrounded by the groove portion 26a and the opening portion 24a takes on the shape of a fan. The same goes for the groove portions 26b and 26c.

Preferably, a total of the opening area of the opening portions 24a to 24c and the area of the regions surrounded by the groove portions 26a to 26c and the opening portions 24a to 24c, respectively, is 15% or more, and 30% or less of the area of the battery lid 2.

Preferably, the thickness of the groove portion 26 is 5% or more, and 30% or less of the thicknesses of the other portions of the battery lid 2. If the thickness of the groove portion 26 is too small, the strength of the battery is reduced. If the thickness of the groove portion 26 is too large, an occurrence of deformation or fusion of the region surrounded by the groove portion 26 and the opening portion 24 becomes difficult even when large amounts of gases are generated and the battery internal pressure becomes too high.

It is preferable that the opening portions 24a to 24c, the thin-walled portions 25a to 25c, or the groove portions 26a to 26c are disposed at positions close to the gas release holes 7b of the interruption disk 7. This is because the gas release efficiency increases.

Preparation of Battery Element

First, the positive electrode 11 is prepared. The above-described positive electrode active material, the binder, and the electrically conductive agent are mixed homogeneously so as to produce a positive electrode mix. The resulting positive electrode mix is dispersed into a solvent so as to make a slurry with a ball mill, a sand mill, a twin-screw kneader, or the like, if necessary. The solvent is not specifically limited insofar as the solvent is inactive with respect to an electrode material and can dissolve a binder, and any one of inorganic solvent and organic solvent may be used. For example, N-methyl-2-pyrrolidone (NMP) is used. It is desirable that the positive electrode active material, the electrically conductive agent, the binder, and the solvent are dispersed homogeneously. The mixing ratio thereof does not much matter. The resulting slurry is uniformly applied to both surfaces of the positive electrode collector 11b by a doctor blade method or the like. Furthermore, drying is conducted at high temperatures to remove the solvent, so that positive electrode active material layers 11a are formed. In this manner, the positive electrode 11 is prepared.

Next, the negative electrode 12 is prepared. The above-described negative electrode active material, the binder, and the electrically conductive agent are mixed homogeneously so as to produce a negative electrode mix. The resulting negative electrode mix is dispersed into a solvent so as to make a slurry. At this time, as in the case of the positive electrode mix, a ball mill, a sand mill, a twin-screw kneader, or the like may be used. As for the solvent, for example, N-methyl-2-pyrrolidone (NMP), methyl ethyl ketone, and the like are used. As in the case of the positive electrode active material, the mixing ratio of the negative electrode active material, the electrically conductive agent, the binder, and the solvent does not much matter. The resulting slurry is uniformly applied to both surfaces of the negative electrode collector 12b by a doctor blade method or the like. Furthermore, drying is conducted at high temperatures to remove the solvent, so that negative electrode active material layers 12a are formed. In this manner, the negative electrode 12 is prepared.

The coating apparatus in not specifically limited. Slide coating or extrusion type die coating, reverse rolls, gravure, knife coaters, kiss coaters, microgravure, rod coaters, blade coaters, and the like may be used. Likewise, the drying method is not specifically limited. Standing drying, blow dryers, warm-air dryers, infrared heaters, far infrared heaters, and the like may be used.

The thus prepared positive electrode 11 and negative electrode 12 are laminated in the order of the positive electrode 11, the separator 13, the negative electrode 12, and the separator 13, and are rolled so as to produce a battery element 10.

Subsequently, the above-described battery element 10 is held in the battery can 1. At this time, holding is conducted in such a way that a rolling surface on the leading side of the negative electrode terminal 16 of the battery element 10 is covered with an insulating plate 9a formed from an insulating resin. Thereafter, one electrode rod is inserted from the center portion of the rolling of battery element, the other electrode rod is disposed on an outer side of the battery can bottom surface, and resistance welding is conducted so as to weld the negative electrode terminal 16 to the battery can 1.

After the negative electrode terminal 16 and the battery can 1 are welded, a center pin 14 is inserted, the insulating plate 9b is disposed on a rolling surface portion located on the open end portion side of the battery can 1, and the electrolytic solution is injected. Furthermore, the safety valve mechanism and the PTC element 4 are disposed on an inner side of the battery lid 2 having the opening portion 24 and the thin-walled portion 25 or the groove portion 26, and the positive electrode terminal 15 is connected to the safety valve 3. The resulting battery lid 2 is attached to the battery can 1 by swaging with the insulative sealing gasket 5 therebetween, so that the inside of the battery can 1 is sealed.

It is desirable that the positive electrode terminal 15 has a certain extent of length in consideration of the production process. This is because the positive electrode terminal 15 is connected in advance to the safety valve 3 disposed on the battery lid 2 and, thereafter, the open end portion of the battery can 1 is sealed. The connection between the positive electrode terminal 15 and the safety valve 3 becomes difficult as the length of the positive electrode terminal 15 is reduced. Consequently, the positive electrode terminal 15 having a certain extent of length is substantially bent into the shape of the letter U in the inside of the battery and is held into the battery can 1.

Regarding the thus produced lithium ion secondary battery, when gases are generated in the inside of the battery, the gases are released through the opening portions 24a to 24c of the battery lid 2 to the outside of the battery. Furthermore, when large amounts of gases are generated, at least one of the thin-walled portions 25a to 25c is deformed toward the outside of the battery because of the pressure of the gases released through the opening portions 24a to 24c and, thereby, still larger amounts of gases are released to the outside of the battery. Moreover, at least one of the thin-walled portions 25a to 25c may be fused or dissolved because of heat of the gases and, thereby, the opening for releasing gases may become larger. Likewise, in the case where the groove portions 26a to 26c are disposed, the portions from the groove portions 26a to 26c to the opening portions 24a to 24c side are deformed or fused or dissolved and, thereby, the opening can be made larger.

According to such a configuration, gases can be released efficiently while the strength of the lithium ion secondary battery is maintained. Therefore, the compatibility between the safety and the quality of the battery can be ensured.

EXAMPLES

The present application will be specifically described below with reference to examples according to an embodiment. However, the present application is not limited to merely these examples.

Example 1

In Example 1, test batteries were prepared in such a way as to have different opening areas after gas ejection, and the performance of respective test batteries were evaluated.

Example 1-1

Preparation of Positive Electrode

As for a positive electrode active material, lithium cobaltate ($LiCoO_2$) was used. A positive electrode mix was prepared by homogeneously mixing 94 parts by mass of lithium cobaltate, 3 parts by mass of graphite serving as an electrically conductive agent, and 3 parts by mass of polyvinylidene fluoride serving as a binder. The positive electrode mix was dispersed into N-methyl-2-pyrrolidone so as to produce a positive electrode mix slurry. The resulting positive electrode mix slurry was applied to both surfaces of aluminum (Al) foil serving as a positive electrode collector, vacuum-drying was conducted at 100° C. for 24 hours and, thereafter, press-molding was conducted with a roll press machine, so that positive electrode active material layers were formed. Subsequently, aluminum (Al) positive electrode terminal was connected to an exposed portion of the positive electrode collector.

Preparation of Negative Electrode

As for a negative electrode active material, a CoSnC-containing material was used. A negative electrode mix was prepared by homogeneously mixing 90 parts by weight of CoSnC-containing material, a total 5 parts by weight of artificial graphite and carbon black serving as an electrically conductive agent and a negative electrode active material, and 5 parts by weight of polyvinylidene fluoride serving as a binder. The negative electrode mix was dispersed into N-methyl-2-pyrrolidone so as to produce a negative electrode mix slurry. The resulting negative electrode mix slurry was applied to both surfaces of copper (Cu) foil serving as a negative electrode collector, vacuum-drying was conducted at 120° C. for 24 hours and, thereafter, press-molding was conducted with a roll press machine, so that negative electrode active material layers were formed. Subsequently, nickel (Ni) negative electrode terminal was connected to a portion, on which the negative electrode active material layer was not formed, of one end portion of the negative electrode collector.

The CoSnC-containing material was synthesized by mixing a tin-cobalt alloy powder and a carbon powder through the use of a mechanochemical reaction. The composition of the synthesized CoSnC-containing material was analyzed. As a result, the cobalt content was 29.3 percent by mass, the tin content was 49.9 percent by mass, and the carbon content was 19.8 percent by mass. The carbon content was measured with a carbon-sulfur analyzer, and the cobalt and the tin contents were measured by inductively coupled plasma (ICT) spectroscopy. As a result of X-ray diffraction analysis of the CoSnC-containing material, a diffraction peak having a diffraction angle $2\theta$ of 1.0° or more and a wide full width at half maximum was observed between diffraction angle $2\theta$ of 20° and 50°. Furthermore, as the result of X-ray photoelectron spectroscopy (XPS) of the CoSnC-containing material, a C1s peak of the CoSnC-containing material was observed in a region lower than 284.5 eV and, therefore, it was ascertained that carbon in the CoSnC-containing material was bonded to another element.

A separator formed from a microporous polypropylene film was prepared. The positive electrode, the separator, the negative electrode, and the separator were laminated in that order and were spirally rolled a plurality of turns so as to prepare a rolled electrode member. Thereafter, a center pin was inserted into the center of the rolled electrode member, the positive electrode terminal was connected to a safety valve, which was connected to the battery lid. In addition, the negative electrode terminal was connected to the battery can, and the rolled electrode member was sandwiched between a pair of insulating plates and was held into the inside of the battery can.

The battery lid used at this time was formed from stainless steel plated with nickel having a thickness of 4.0 mm and had opening portions and thin-walled portions disposed in such a way as to adjoin the opening portions. The opening portions were disposed separately at three places in a circular cylinder surface-shaped side wall of a protrusion portion of the battery lid. The area of each opening portion was 3% and the total thereof was 9% relative to the area of the battery lid. Furthermore, the thin-walled portions having a thickness of 2.0 mm (50% relative to the thickness of the battery lid) were disposed separately at three places in a top portion of the protrusion portion of the battery lid. The area of each thin-walled portion was 2% and the total thereof was 6% relative to the area of the battery lid. In this manner, the total opening area of the battery lid when the gas was ejected was specified to be 15%.

An electrolytic solution was injected into the inside of the battery can from above the insulating plate. In the electrolytic solution used, $LiPF_6$ serving as an electrolytic salt was dissolved at a content of 1 mol/l into a solvent in which equal mass ratio of ethylene carbonate (EC) and diethyl carbonate (DEC) were mixed. Subsequently, a safety valve mechanism including a safety valve, a disk holder, and an interruption disk, a PTC element, and the battery lid were fixed to the opening portion of the battery can by swaging with an insulative sealing gasket 5 therebetween, so that a so-called 18650 size test battery was prepared.

Example 1-2

A test battery was prepared as in Example 1-1 except that the area of each thin-walled portion of the battery lid was specified to be 3% (total area of the thin-walled portions was 90%) and the total opening area of the battery lid when the gas was ejected was specified to be 18%.

Example 1-3

A test battery was prepared as in Example 1-1 except that the area of each thin-walled portion of the battery lid was specified to be 7% (total area of the thin-walled portions was 21%) and the total opening area of the battery lid when the gas was ejected was specified to be 30%.

Comparative Example 1-1

A test battery was prepared as in Example 1-1 except that the area of each thin-walled portion of the battery lid was specified to be 1% (total area of the thin-walled portions was 3%) and the total opening area of the battery lid when the gas was ejected was specified to be 12%.

Comparative Example 1-2

A test battery was prepared as in Example 1-1 except that the area of each thin-walled portion of the battery lid was specified to be 8% (total area of the thin-walled portions was 24%) and the total opening area of the battery lid when the gas was ejected was specified to be 33%.

Example 1-4

A test battery was prepared as in Example 1-1 except that a thin-walled portion of the battery lid was not disposed, a groove portion (thickness was 0.5 mm which was 12.5% relative to the thickness of the battery lid) was disposed in the vicinity of each of three opening portions, and the area of each portion surrounded by the opening portion and the groove portion was specified to be 2% relative to the area of the battery lid.

Example 1-5

A test battery was prepared as in Example 1-4 except that the area of the portion surrounded by one opening portion and one groove portion of the battery lid was specified to be 3% (total area of the three portions was 9%) and the total opening area of the battery lid when the gas was ejected was specified to be 18%.

Example 1-6

A test battery was prepared as in Example 1-4 except that the area of the portion surrounded by one opening portion and one groove portion of the battery lid was specified to be 7% (total area of the three portions was 21%) and the total opening area of the battery lid when the gas was ejected was specified to be 30%.

Comparative Example 1-3

A test battery was prepared as in Example 1-4 except that the area of the portion surrounded by one opening portion and one groove portion of the battery lid was specified to be 1% (total area of the three portions was 3%) and the total opening area of the battery lid when the gas was ejected was specified to be 12%.

Comparative Example 1-4

A test battery was prepared as in Example 14 except that the area of the portion surrounded by one opening portion and one groove portion of the battery lid was specified to be 8% (total area of the three portions was 24%) and the total opening area of the battery lid when the gas was ejected was specified to be 33%.

Comparative Example 1-5

A test battery was prepared as in Example 1-1 except that the battery lid was provided with no thin-walled portion nor groove portion.

The battery performance of each of the above-described test batteries was evaluated as described below.

(a) Flame Exposure Test

A gauze was placed on a tripod, and each of the above-described test batteries was placed on the gauze.

At this time, the test battery was arranged in such a way that the height direction (positive electrode-negative electrode direction) of the battery becomes parallel to a horizontal direction. Subsequently, a central portion of the test battery was flamed with a gas burner from under the gauze for 40 seconds. Thereafter, in the case where the test battery was moved from the gauze because of the pressure and the like of gas release, the movement distance was measured. Five test batteries of each of Examples and Comparative examples were evaluated.

(b) Drop Test

Each of the above-described test batteries was dropped once from a height of 1.2 m, and deformation of the battery lid was checked.

(c) Terminal Welding Test

Figure 6A:
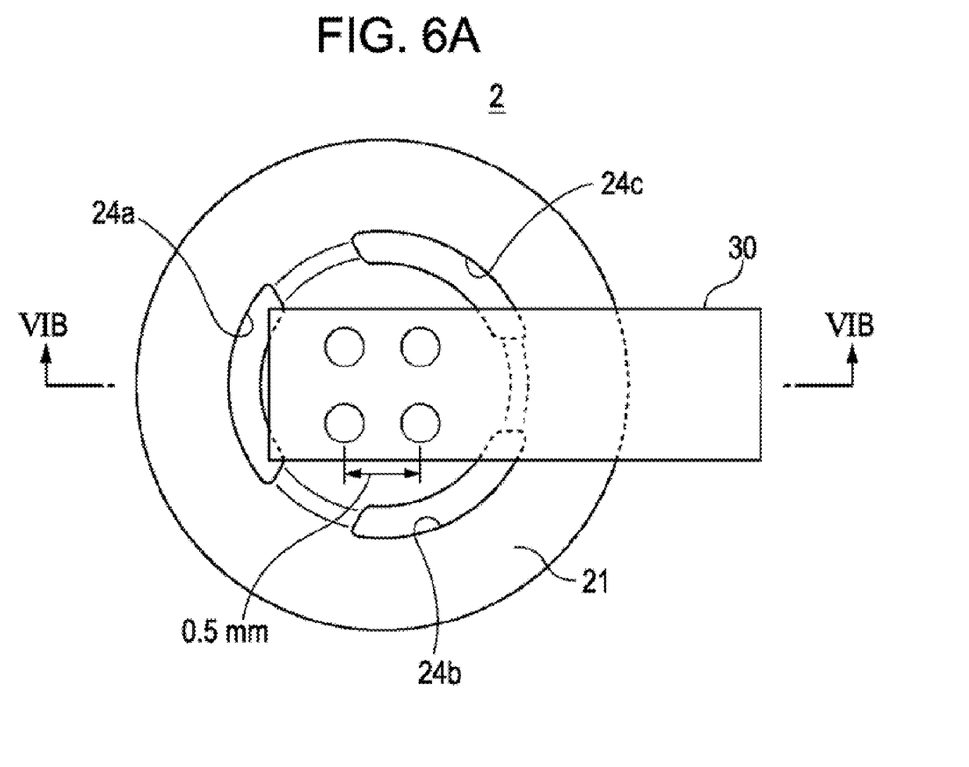
FIGS. 6A and 6B are schematic diagrams showing a test method of a terminal welding test in an example.
Figure 6B:
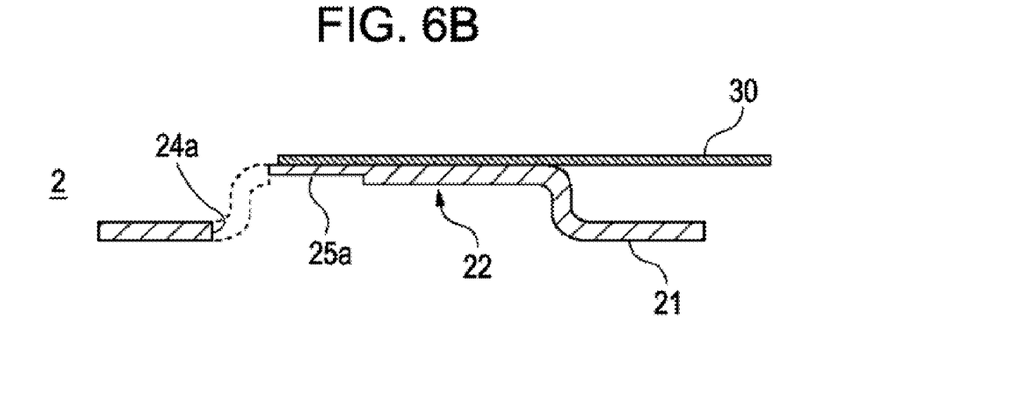

As shown in FIG. 6A and FIG. 6B, on the assumption that a battery package was prepared by using the test battery, a nickel plate (thickness: 0.1 mm) 30 was disposed in such a way as to touch a top portion 23b of a protrusion portion 22 of a battery lid 2. Subsequently, the battery lid 2 was connected to the nickel plate 30 through resistance welding, and deformation of the battery lid due to heat or pressure was checked. The connection was conducted through four-point resistance welding at a pitch of 0.5 mm by using an electrode bar having a diameter of 2.0 mm.

The evaluation results are shown in Table 1.

As shown in Table 1, regarding Example 1-1 to Example 1-6 in which thin-walled portions or groove portions are disposed and the total opening area of the battery lid after the gas was ejected was 15% or more, and 30% or less, the batteries were not moved in the flame exposure test. Furthermore, the battery lids were not deformed in the drop test and the terminal welding test.

On the other hand, regarding Comparative example 1-5 having a configuration in the related art, in which the battery lid was provided with no thin-walled portion nor groove portion, all five test batteries were moved in the flame exposure test. This was because of the pressure in the gas ejection. Furthermore, regarding Comparative example 1-1 and Comparative example 1-3 in which the thin-walled portions or the groove portions were disposed, but the total opening area after the gas was ejected was less than 15%, three of five test batteries were moved.

Regarding Comparative example 1-2 and Comparative example 1-4 in which the thin-walled portions or the groove portions were disposed, but the total opening area after the gas was ejected exceeded 30%, the batteries were not moved in the flame exposure test. However, the battery lids were deformed in the drop test and the terminal welding test.

As is clear from these results, the compatibility between the safety when gases are ejected and the strength of the battery can be ensured by disposing the portions which are deformed when gases are ejected (the regions which can be deformed because of disposition of the thin-walled portions or the groove portions) besides the opening portions in the

TABLE 1

| | Shape of battery lid | Opening portion (%) | Opening area Thin-walled portion or groove portion (%) | Total (%) | Flame exposure test | | | | | Drop test | Terminal welding test |
|---|---|---|---|---|---|---|---|---|---|---|---|
| | | | | | Battery 1 | Battery 2 | Battery 3 | Battery 4 | Battery 5 | | |
| Example 1-1 | thin-walled | 9 | 6 | 15 | ○ | ○ | ○ | ○ | ○ | ○ | ○ |
| Example 1-2 | thin-walled | 9 | 9 | 18 | ○ | ○ | ○ | ○ | ○ | ○ | ○ |
| Example 1-3 | thin-walled | 9 | 21 | 30 | ○ | ○ | ○ | ○ | ○ | ○ | ○ |
| Comparative example 1-1 | thin-walled | 9 | 3 | 12 | ○ | ○ | 1 m | 2 m | 2 m | ○ | ○ |
| Comparative example 1-2 | thin-walled | 9 | 24 | 33 | ○ | ○ | ○ | ○ | ○ | X | X |
| Example 1-4 | groove | 9 | 6 | 15 | ○ | ○ | ○ | ○ | ○ | ○ | ○ |
| Example 1-5 | groove | 9 | 9 | 18 | ○ | ○ | ○ | ○ | ○ | ○ | ○ |
| Example 1-6 | groove | 9 | 21 | 30 | ○ | ○ | ○ | ○ | ○ | ○ | ○ |
| Comparative example 1-3 | groove | 9 | 3 | 12 | ○ | ○ | 1 m | 2 m | 2 m | ○ | ○ |
| Comparative example 1-4 | groove | 9 | 24 | 33 | ○ | ○ | ○ | ○ | ○ | X | X |
| Comparative example 1-5 | related art | 9 | — | 9 | 1 m | 2 m | 3 m | 3 m | 3 m | ○ | ○ |

Flame exposure test ○: no movement of battery cell

Drop test ○: no deformation X: there is deformation of top cover

Terminal welding test ○: no deformation X: there is deformation of top cover battery lid and specifying the area of the portions which are deformed when gases are ejected to be 15% or more, and 30% or less relative to the area of the battery lid.

Example 2

In example 2, test batteries were prepared while the thickness of the thin-walled portion or the groove portion was changed, and the performance of respective test batteries were evaluated.

Example 2-1

A test battery was prepared as in Example 1-1 except that the thickness of the thin-walled portion was specified to be 0.4 mm (10% relative to the thickness of the battery lid).

Example 2-2

A test battery was prepared as in Example 1-1 except that the thickness of the thin-walled portion was specified to be 1.6 mm (40% relative to the thickness of the battery lid).

Example 2-3

A test battery was prepared as in Example 1-1 except that the thickness of the thin-walled portion was specified to be 3.0 mm (75% relative to the thickness of the battery lid).

Example 2-4

A test battery was prepared as in Example 1-4 except that the thickness of the groove portion was specified to be 0.2 mm (5% relative to the thickness of the battery lid).

Example 2-5

A test battery was prepared as in Example 1-4 except that the thickness of the groove portion was specified to be 0.6 mm (15% relative to the thickness of the battery lid).

Example 2-6

A test battery was prepared as in Example 1-4 except that the thickness of the groove portion was specified to be 1.2 mm (30% relative to the thickness of the battery lid).

Comparative Example 2-1

A test battery was prepared as in Example 1-1 except that the thickness of the thin-walled portion was specified to be 0.3 mm (7.5% relative to the thickness of the battery lid).

Comparative Example 2-2

A test battery was prepared as in Example 1-1 except that the thickness of the thin-walled portion was specified to be 3.1 mm (77.5% relative to the thickness of the battery lid).

Comparative Example 2-3

A test battery was prepared as in Example 1-4 except that the thickness of the groove portion was specified to be 0.1 mm (2.5% relative to the thickness of the battery lid).

Comparative Example 2-4

A test battery was prepared as in Example 1-4 except that the thickness of the groove portion was specified to be 1.3 mm (32.5% relative to the thickness of the battery lid).

The battery performance of each of the above-described test batteries was evaluated in a manner similar to that in Example 1.

The evaluation results are shown in Table 2.

TABLE 2

| | Shape of battery lid | Thickness of thin-walled portion or groove portion (%) | Flame exposure test | Drop test | Terminal welding test |
|---|---|---|---|---|---|
| Example 2-1 | thin-walled | 10 | ○ | ○ | ○ |
| Example 2-2 | thin-walled | 40 | ○ | ○ | ○ |
| Example 2-3 | thin-walled | 75 | ○ | ○ | ○ |
| Comparative example 2-1 | thin-walled | 7.5 | ○ | X | X |
| Comparative example 2-2 | thin-walled | 77.5 | X | ○ | ○ |
| Example 2-4 | groove | 5 | ○ | ○ | ○ |
| Example 2-5 | groove | 15 | ○ | ○ | ○ |
| Example 2-6 | groove | 30 | ○ | ○ | ○ |
| Comparative example 2-3 | groove | 2.5 | ○ | X | X |
| Comparative example 2-4 | groove | 32.5 | X | ○ | ○ |

Flame exposure test ○: no movement of battery cell
Drop test ○: no deformation X: there is deformation of top cover
Terminal welding test ○: no deformation X: there is deformation of top cover As shown in Table 2, regarding Example 2-1 to Example 2-3, in which the thicknesses of the thin-walled portions were 10% or more, and 75% or less of the thickness of the battery lid, and Example 24 to Example 2-6, in which the thicknesses of the groove portions were 5% or more, and 30% or less of the thickness of the battery lid, the batteries were not moved in the flame exposure test. Furthermore, the battery lids were not deformed in the drop test and the terminal welding test.

On the other hand, regarding Comparative example 2-1 in which the thicknesses of the thin-walled portions were less than 10% of the thickness of the battery lid and Comparative example 2-3 in which the thicknesses of the groove portions were less than 5% of the thickness of the battery lid, the batteries were not moved in the flame exposure test, but the battery lids were deformed in the drop test and the terminal welding test.

Furthermore, regarding Comparative example 2-2 in which the thicknesses of the thin-walled portions exceeded 75% of the thickness of the battery lid and Comparative example 2-4 in which the thicknesses of the groove portions exceeded 30% of the thickness of the battery lid, the battery lids were not deformed in the drop test and the terminal welding test, but the batteries were moved in the flame exposure test.

As is clear from these results, the compatibility between the safety when gases are ejected and the strength of the battery can be ensured by disposing the portions which are deformed when gases are ejected (the regions which can be deformed because of disposition of the thin-walled portions or the groove portions) besides the opening portions in the battery lid, specifying the thicknesses of the thin-walled portions to be 10% or more, and 75% or less of the thickness of the battery lid in the case where the thin-walled portions are disposed, and specifying the thicknesses of the groove portions to be 5% or more, and 30% or less of the thickness of the battery lid in the case where the groove portions are disposed.

Up to this point, an embodiment according to the present application has been described specifically. However, the present application is not limited to the above-described embodiment, and various modification can be made on the basis of the technical idea of the present application.

For example, the numerical values explained in the above-described embodiment are no more than exemplifications, and numerical values different from them may be used as necessary. Furthermore, the shapes of the thin-walled portion and the groove portion are not limited to those described above.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A nonaqueous electrolyte battery comprising:
    an outer case having one open end portion;
    a battery element held in the outer case; and
    a battery lid which is disposed on the one open end portion and which is provided with:
        a cylindrical protrusion portion protruded toward the outside of the battery,
        at least two opening portions disposed in a side wall of the protrusion portion, and
        release portions disposed adjoining the respective opening portions so as to deform in accordance with an increase in internal pressure of the battery,
    wherein the release portions are thin-walled portions having thicknesses smaller than the thicknesses of the other portions of the battery lid, and
    wherein the thin-walled portions are disposed at a top portion of the protrusion portion of the battery lid.

2. The nonaqueous electrolyte battery according to claim 1, wherein a total of the opening area of the opening portions and the area of the release portions is 15% or more, and 30% or less of the area of the battery lid.

3. The nonaqueous electrolyte battery according to claim 1, wherein the thicknesses of the thin-walled portions are 10% or more, and 75% or less of the thicknesses of the other portions of the battery lid.

4. The nonaqueous electrolyte battery according to claim 1, wherein the battery lid comprises an annular flange-shaped portion disposed so as to surround the protrusion portion.

5. The nonaqueous electrolyte battery according to claim 1, wherein the thin-walled portions are disposed at regular intervals relative to the center of the battery lid.

6. The nonaqueous electrolyte battery according to claim 1, wherein the thin-walled portions are disposed in a shape of a fan.

* * * * *